(12) United States Patent
Gage et al.

(10) Patent No.: US 7,609,469 B2
(45) Date of Patent: Oct. 27, 2009

(54) ALTERNATIVE SENSORS FOR TRACKING AND TIMING IN BIT PATTERNED MEDIA

(75) Inventors: Edward Charles Gage, Mars, PA (US); Venkata Sailaja Chilaka, Pittsburgh, PA (US); Chubing Peng, Allison Park, PA (US); Mark Edward Re, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 371 days.

(21) Appl. No.: 11/770,873

(22) Filed: Jun. 29, 2007

(65) Prior Publication Data

US 2009/0002867 A1 Jan. 1, 2009

(51) Int. Cl.
G11B 5/09 (2006.01)
(52) U.S. Cl. ...................................................... 360/51
(58) Field of Classification Search ................ 360/51, 360/48, 75, 69, 70
See application file for complete search history.

(56) References Cited

U.S. PATENT DOCUMENTS

| | | | |
|---|---|---|---|
| 4,737,877 A * | 4/1988 | Krongelb et al. ............. 360/135 |
| 5,475,666 A * | 12/1995 | Ito et al. .................. 369/47.52 |
| 5,712,840 A * | 1/1998 | Matsumura et al. ........ 369/13.29 |
| 5,715,157 A * | 2/1998 | Kuhn ........................ 369/47.42 |
| 5,872,676 A | 2/1999 | Smith et al. |
| 5,999,360 A | 12/1999 | Meyer et al. |
| 6,181,492 B1 * | 1/2001 | Bonyhard ..................... 360/17 |
| 6,212,023 B1 * | 4/2001 | Bonyhard ..................... 360/15 |
| 6,628,598 B2 | 9/2003 | Edwards et al. |
| 6,751,060 B2 | 6/2004 | Lundstrom |
| 6,754,017 B2 | 6/2004 | Rettner et al. |
| 6,873,492 B2 | 3/2005 | Lundstrom |
| 6,940,669 B2 | 9/2005 | Schaenzer et al. |
| 7,027,263 B2 | 4/2006 | Ottesen et al. |
| 7,092,344 B2 * | 8/2006 | McNiece ..................... 369/94 |
| 7,280,297 B2 * | 10/2007 | Hamann et al. ............. 360/59 |
| 7,403,461 B2 * | 7/2008 | Kobayashi ............... 369/59.24 |
| 2002/0008886 A1 * | 1/2002 | Dausmann et al. ............ 359/3 |
| 2005/0052982 A1 * | 3/2005 | McNiece ................. 369/112.1 |
| 2006/0023357 A1 * | 2/2006 | Deckers et al. ............. 360/134 |
| 2006/0182000 A1 * | 8/2006 | McNiece ................. 369/112.1 |
| 2006/0233088 A1 * | 10/2006 | McNiece ................... 369/103 |

* cited by examiner

*Primary Examiner*—Fred Tzeng
(74) *Attorney, Agent, or Firm*—Robert P. Lenart, Esq.; Pietragallo Gordon Alfano Bosick & Raspanti, LLP (57) ABSTRACT

An apparatus includes a bit patterned magnetic storage media, a write transducer positioned adjacent to the bit patterned magnetic storage media, a write driver coupled to the write transducer to deliver write pulses to the write transducer, an optical sensor for producing a bit pattern signal, and a timing recovery circuit for producing a synchronization signal in response to the bit pattern signal, wherein the timing of the write pulses is adjusted in response to the synchronization signal.

19 Claims, 6 Drawing Sheets

ALTERNATIVE SENSORS FOR TRACKING AND TIMING IN BIT PATTERNED MEDIA

BACKGROUND

Magnetic recording on bit patterned media (BPM) is seen as a way to increase the areal recording density compared to conventional magnetic recording while avoiding the problem of the super-paramagnetic limit. The surface of the recording medium includes a regular array of islands and trenches. Different geometries are possible for the bit island location including the staggered geometry.

In bit patterned media, the magnetic material on the disc is patterned into small isolated blocks or islands such that there is a single magnetic domain in each island or "bit". The single magnetic domains can be a single grain or a plurality of strongly coupled grains that switch magnetic states in concert as a single magnetic volume. This is in contrast to continuous media wherein a single "bit" may have multiple magnetic domains separated by domain walls. The media may be fabricated so that there is no magnetic material in the regions between the blocks.

In magnetic storage media, bits are written on the magnetic medium by applying a magnetic field on the recording medium using the write head. The write head is controlled by a clock, which determines where the bit transitions occur. To read these bits (at a later time), a read head senses the magnetic field on the medium and converts it into an electrical signal, which is further processed. The read process also uses a clock, which can be the same clock as the write clock. However the two clocks are to be considered non-synchronous because they operate at different times. The read channel samples the readback waveform, and processes the samples to recover the bits.

Timing recovery is a mechanism used to determine where to sample the signal. The nominal sampling frequency is known, but because no two clocks are synchronous, it is desirable to determine exactly where to sample the signal using other means.

In magnetic recording systems that use continuous media, there is no need to synchronize the writing of data with the position of the media. For this reason, the data is written using a free running clock and sampling instances are recovered during the read process. However, for patterned media, the locations of the bits to be written are predefined (i.e., on the bit islands), and write synchronization is needed. Thus bit patterned media restricts the locations of the bits to be written. If the write head is not synchronized to the bit island location, there will be cycle slips. Even a single cycle slip would cause system failure. Read-while-write has been proposed for write synchronization, but the drawbacks are reader saturation, crosstalk, etc.

A challenge in the implementation of bit patterned recording is timing recovery or synchronization. The write head needs to be aware of positions of the bit islands in order to precisely switch the write fields as the head passes over a track. Similarly, the read head needs to recover the correct sampling instants from the readback waveform. Failure in write synchronization causes insertion/deletion errors of bits as well as bit flips in its vicinity.

SUMMARY

In one aspect, this invention provides an apparatus including a bit patterned magnetic storage media, a write transducer positioned adjacent to the bit patterned magnetic storage media, a write driver coupled to the write transducer to deliver write pulses to the write transducer, an optical sensor for producing a bit pattern signal, and a timing recovery circuit for producing a synchronization signal in response to the bit pattern signal, wherein the timing of the write pulses is adjusted in response to the synchronization signal.

In another aspect, the invention provides a method including: using an optical sensor to produce a bit pattern signal representative of locations of bit islands in a bit patterned magnetic storage media, and using the bit pattern signal to control the timing of write pulses applied to a write transducer to control a direction of magnetization of the bit islands.

In yet another aspect, the invention provides a method including: directing a spot of light onto a surface of a bit patterned data storage media, and producing an error signal in response to light reflected from an island on the bit patterned data storage media, wherein the error signal is representative of a position of the spot with respect to the island.

These and various other features and advantages will be apparent from a reading of the following detailed description.

DETAILED DESCRIPTION OF THE INVENTION

When the bit patterned storage media is used in a data storage device, it is necessary to detect and control the relative position of a read and/or write transducer, e.g., a recording head, with respect to the islands on the media. In one aspect, this invention provides a method and apparatus for providing a position signal that can be used for timing recovery in a data storage device including a bit patterned media. A non-magnetic sensor can be used to sense the presence of islands in the media.

Figure 1:
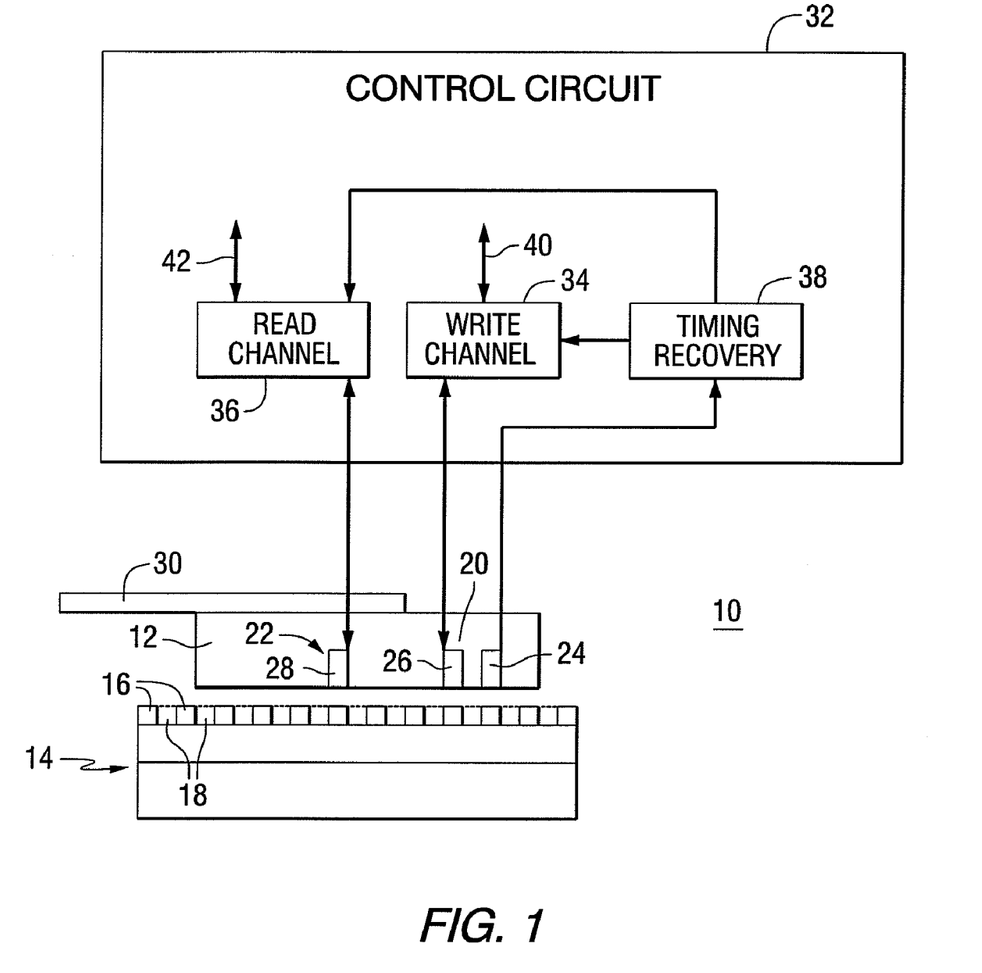
FIG. 1 is a schematic representation of portions of a data storage device.

FIG. 1 is a schematic representation of portions of a data storage device 10 including a slider 12 and an associated data storage media 14. In this example, the data storage media is a patterned media including a plurality of islands 16 of magnetic material separated by trenches 18, which may be filled with non-magnetic material.

A slider or carrier is positioned adjacent to a surface of the storage media in accordance with known techniques, and includes a write head 20, a read head 22, and a bit pattern sensor 24. The write head includes a write transducer 26 that applies a magnetic field to the storage media to control the direction of magnetization of the islands. The read head includes a sensor 28, such as a magnetoresistive (MR) element, tunneling magnetoresistive (TMR) element, or giant magnetoresistive (GMR) element, which produces an analog voltage signal in response to magnetic fields produced by the magnetized islands. The bit pattern sensor 24 produces a signal that contains information about the relative locations of the bit pattern sensor and islands on the media. An arm 30 can be used to position the slider with respect to the media. The arm can be controlled in accordance with known servo techniques.

In normal operation, the slider flies over a track (or a pair of sub-tracks if staggered) and the tracks include a plurality of bit islands separated by trenches. The write head passes close enough to the islands to magnetize the whole bit island to the desired polarization (up or down, for example) depending on the information bit being written. However the write head field does not penetrate the trenches well and no information can be written in the trenches. In effect the trenches act as stable domain-wall boundaries between neighboring bits.

The read and write heads are connected to a control circuit 32 that includes a write channel 34 for delivering voltage or current write pulses to the write head and a read channel 36 for processing signals produced by the read head. A timing recovery circuit 38 uses the signals from the bit pattern sensor to provide a control signal that can be used to adjust the timing of the write pulses. The control circuit can contain other elements that are not specifically related to this description, and are therefore not shown. The write channel can communicate with other components in the control circuit and/or with a host device on a bus 40. The read channel can communicate with other components in the control circuit and/or with a host device on a bus 42.

Figure 2:
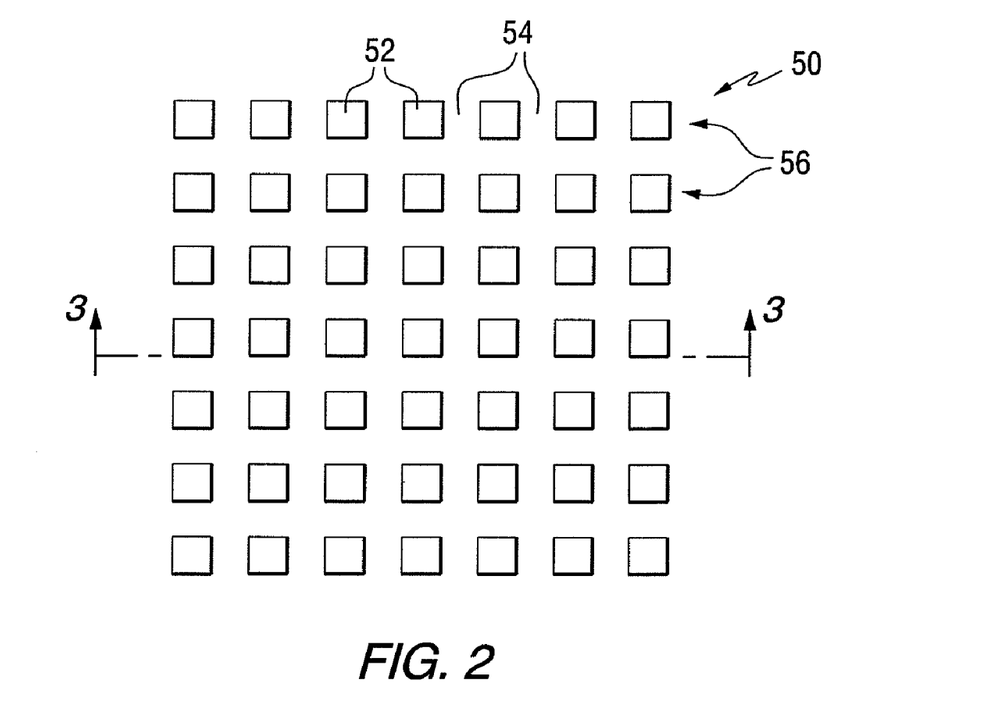
FIG. 2 is a plan view of a portion of a surface of a bit patterned storage media.

FIG. 2 is a schematic plan view of a bit patterned media 50. The media includes a plurality of islands 52 of magnetic material separated by trenches 54. In this example, the islands are arranged in linear arrays to form data tracks 56. In other examples, the islands could be arranged in a staggered array, with the data tracks being formed by two adjacent sub-tracks.

Figure 3:
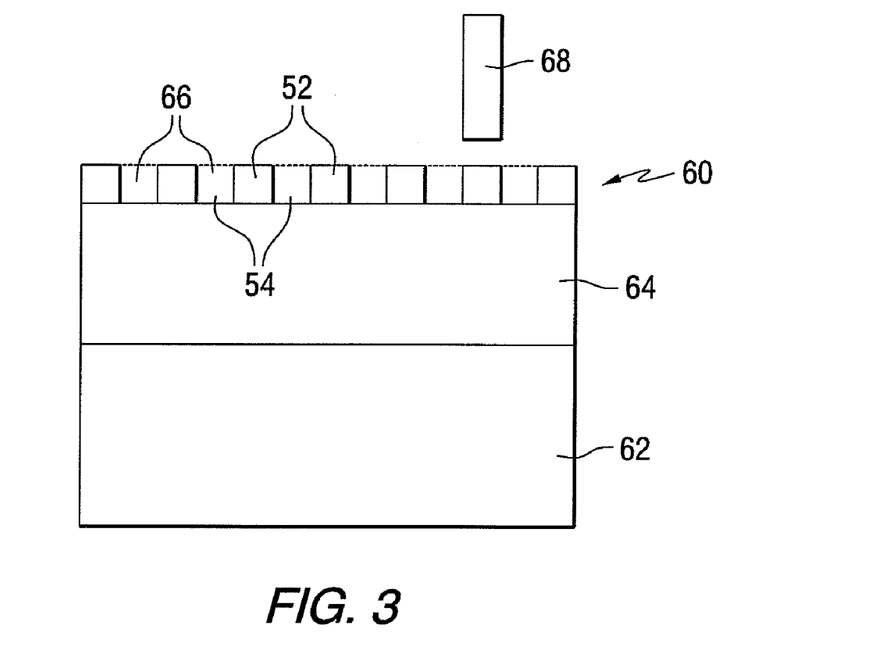
FIG. 3 is a cross-sectional view of the bit patterned storage media of FIG. 2 taken along line 3-3.

FIG. 3 is a cross-sectional view of the bit patterned media of FIG. 2. The magnetic islands are arranged in a recording layer 60 that is supported by a substrate 62. Other layers, such as a heat sink layer 64 may also be included. To form a planarized media, a non-magnetic dielectric material 66 may be positioned between the islands. In an unplanarized media, the islands can be spaced apart without any solid material in the spaces between the islands. A bit pattern sensor 68 is positioned adjacent to the track.

In one aspect, this invention uses a non-magnetic bit pattern sensor 68 to sense the bit island locations. A non-magnetic sensor can use physical properties of the bit patterned media to produce a signal that is related to the relative position of the sensor and bit islands on the media. By using a non-magnetic sensor, interference with the magnetic fields produced by the write head or sensed by the read head, is avoided.

In one example used for simulation purposes, the islands were assumed to have a square cross-sectional shape in a plane parallel to or coincident with the surface of the media, with each bit island being in the form of a pillar having a 24 nm by 24 nm square cross-sectional shape. In this example, the islands are separated by a distance of 24 nm. The islands can be a magnetic material, and dielectric material can be for example $SiO_2$. It should be understood that the islands may have other cross-sectional shapes and the shapes may not be uniform.

In one example, the bit pattern sensor includes an optical transducer to direct light onto the media and an optical detector to detect light reflected from the media to produce a position signal that can be processed and used to control the relative position of a read and/or write transducer with respect to the islands on the media.

Since the bit islands have a different coefficient of reflectivity from the trenches, or dielectric material in the trenches, light reflected from the surface of the media can be used to track the bit islands and synchronize the head to write bits at those locations.

Figure 4:
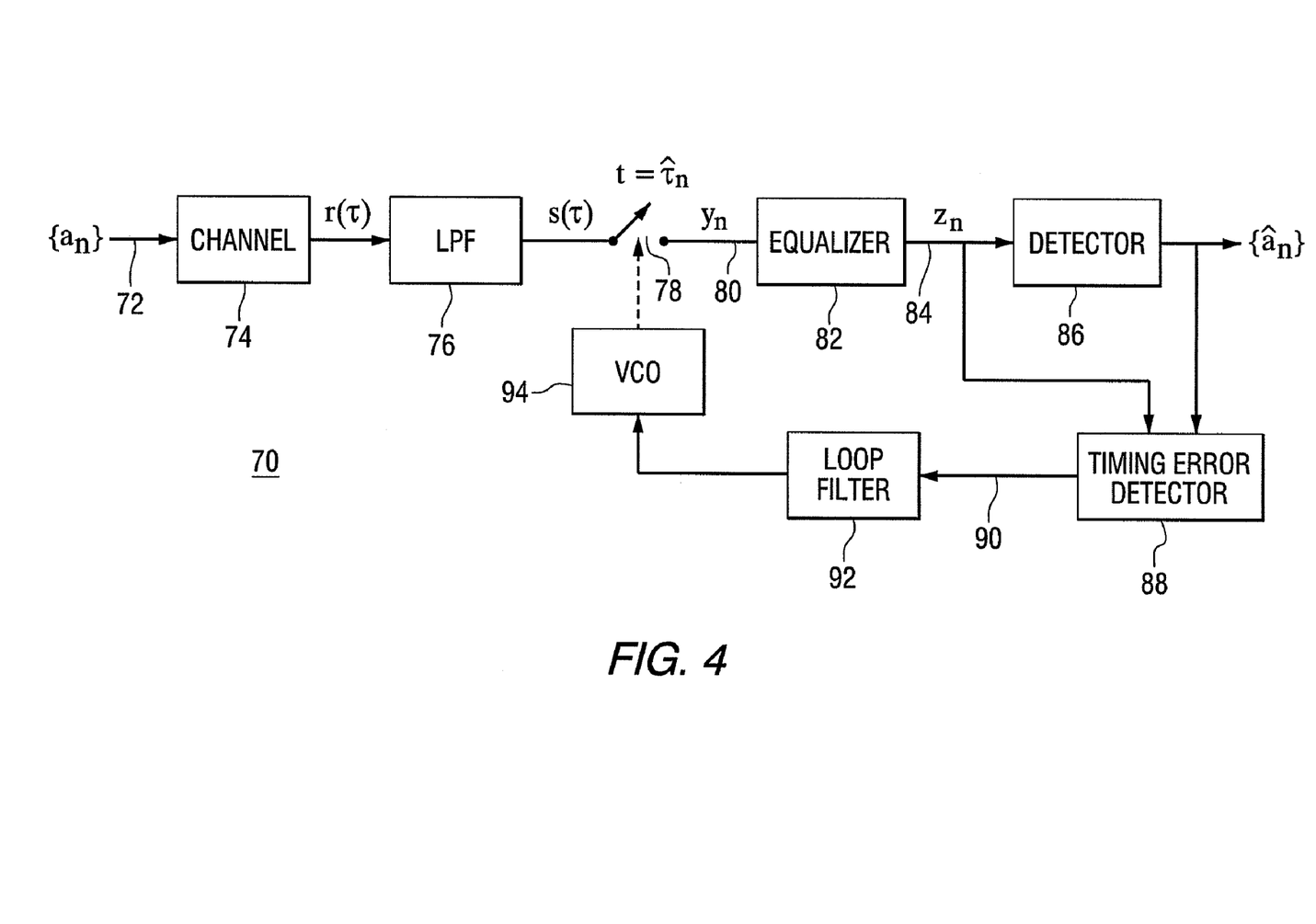
FIG. 4 is a schematic diagram of a timing recovery circuit.

FIG. 4 is a block diagram of a timing recovery circuit 70. The timing circuit includes a front end including an input 72 to a channel 74, and a low pass filter 76. The signal produced by a sensor is a signal $a_n$ that is transmitted through the channel, resulting in a received signal $r(\tau)$. The received signal is filtered by the low pass filter to produce filtered signal $s(\tau)$. The filtered signal is then sampled as illustrated by a sampling switch 78 to produce a sampled signal $y_n$ on line 80. The sampled signal is processed by an equalizer 82 to produce an equalized signal $z_n$ on line 84. The equalized signal is then detected in a detector 86 to produce an output signal. A timing error detector 88 uses the equalized signal and the output signal to produce an error signal on line 90. The error signal is filtered by a loop filter 92 and the output of the loop filter is used to control the frequency of a voltage controlled oscillator 94. The voltage controlled oscillator then controls the sampling times that are used to take samples of the filtered signal $s(\tau)$.

Thus it can be seen that for timing detection, a pattern sensor can be used to produce a signal that is sampled to produce a plurality of samples. Timing recovery architectures include a timing error detector that processes the received samples to produce a quantity that is a measure of the timing phase error. This quantity is further passed through a loop filter to produce a correction signal that is used to control the sampling timing, for example by driving a sampler through a voltage controlled oscillator (VCO). The detected bits are used by the timing recovery algorithm with the assumption that they are error free.

Figure 5:
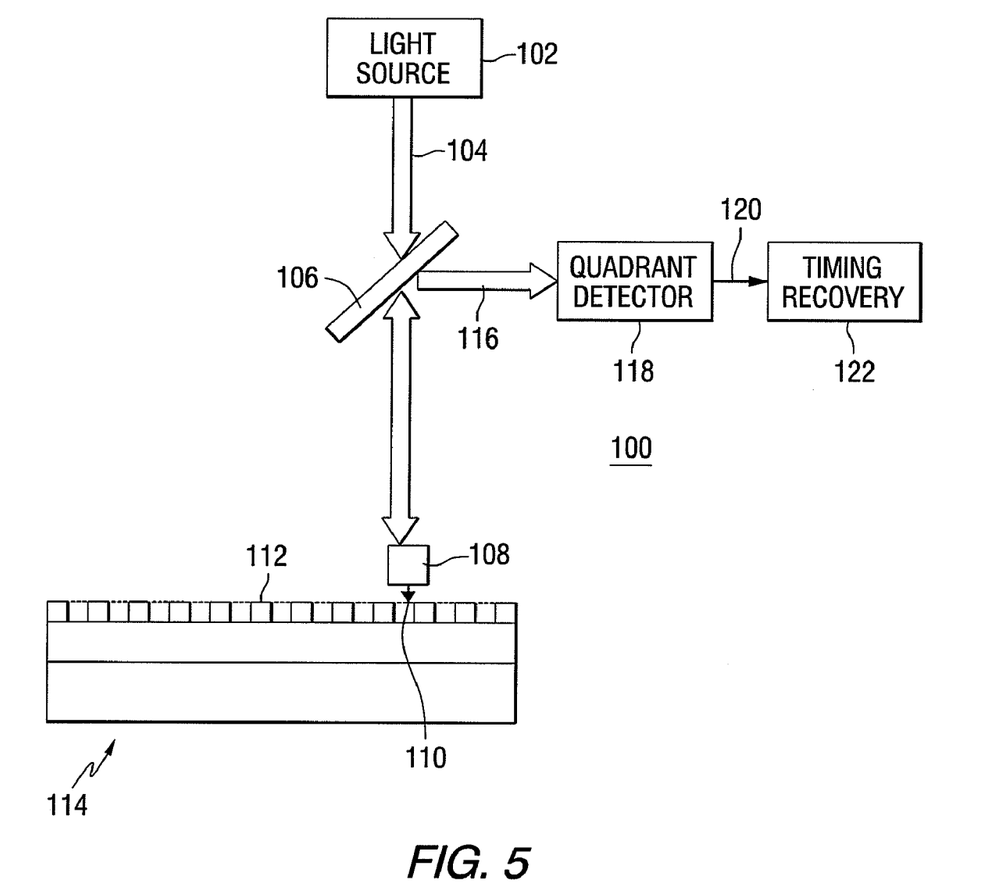
FIG. 5 is a schematic representation of a tracking system for use with a bit patterned storage media.

FIG. 5 is a schematic representation of an optical tracking system 100 for use with a bit patterned storage media. The system includes a light source 102 that directs light 104 through a semi-transparent mirror 106 to a near field optical transducer 108. The near field optical transducer 108 concentrates the light into a small spot 110 on the surface 112 of the bit patterned storage media 114. A portion 116 of the incident light is reflected back toward the mirror and reflected by the mirror to a detector 118. The detector produces an error signal 120 that can then be processed by a servo system 122 to control the position of the recording head.

Figure 6:
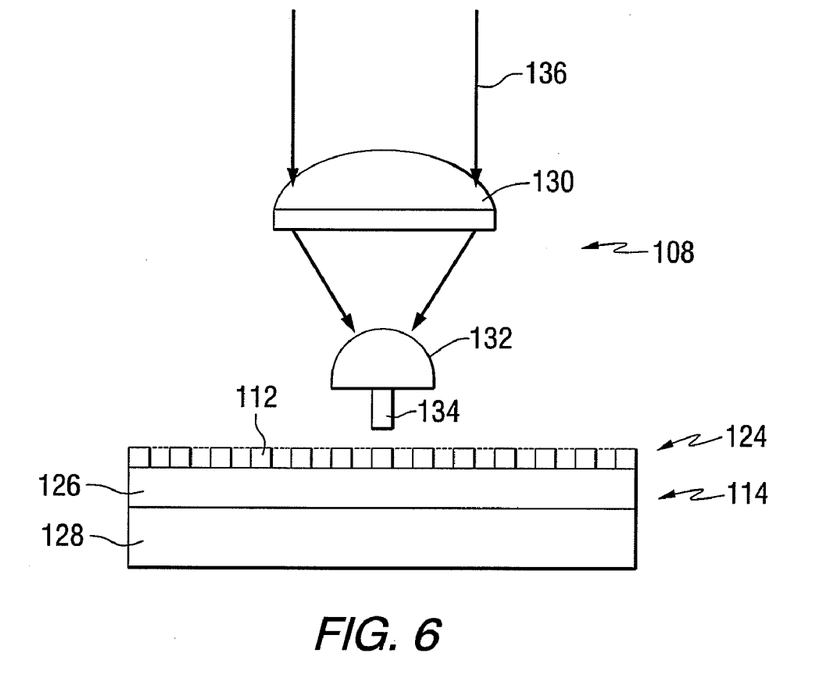
FIG. 6 is a schematic representation of an optical transducer.

FIG. 6 is a schematic representation of a near field optical transducer 108 positioned adjacent to a surface 112 of a bit patterned storage media 114, including a recording layer 124 positioned adjacent to an electrically conductive heat sink layer 126, which is positioned adjacent to a substrate 128. In this example, the near field optical transducer 108 includes an objective lens 130, a solid hemispherical lens 132 and a metallic pin 134.

The near field optical transducer condenses and delivers the light to the surface of bit patterned media. A radially polarized beam of light 136 is brought to focus onto the center of the hemispherical lens by the objective lens, and illuminates the metallic pin, which may be, for example gold. The end of the metallic pin can be positioned about 10 nm from the surface of the storage medium. In one example, the gold pin has a 12 nm pointed tip and its dimension is optimized for maximum optical efficiency. The storage media includes square granular islands, separated by a dielectric material such as $SiO_2$. Each granule has size 24 nm by 24 nm in the recording film plane. The separation between granules is also 24 nm.

Figure 7:
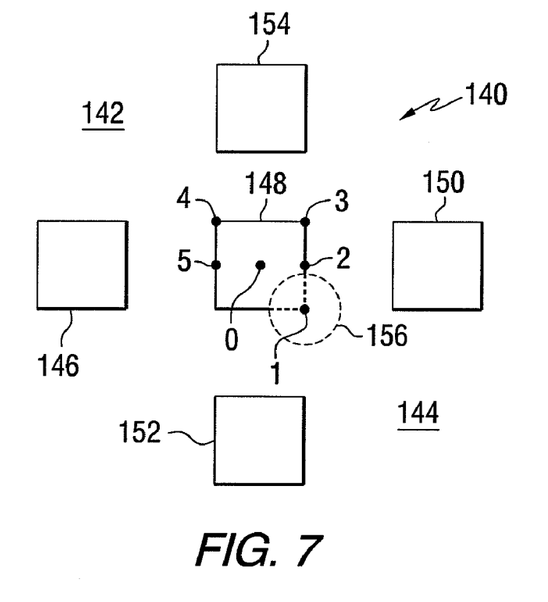
FIG. 7 is an enlarged plan view of a portion of a surface of a bit patterned storage media.

FIG. 7 is an enlarged plan view of a portion 140 of a surface 142 of a bit patterned storage media 144, including islands 146, 148, 150, 152 and 154. The numbers on and around island 148 represent approximate locations of a center of an optical spot. In the example of FIG. 5 the optical spot 156 is centered at the lower and right corner of the central bit (i.e., position 1).

Figure 8:
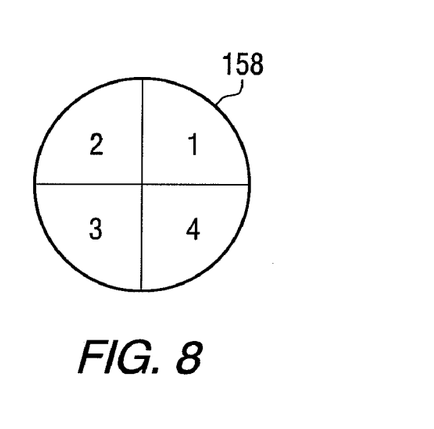
FIG. 8 is a schematic representation of a quadrant detector.

The incident light spot is reflected and the reflected beam can be monitored while the optical spot is placed at different positions, as shown in FIG. 7. A quadrant detector can be used to detect the reflected intensity. FIG. 8 is a schematic representation of a quadrant detector 158. The quadrant detector detects light in four quadrants numbered 1, 2, 3 and 4. From the four quadrants 1, 2, 3 and 4, the detector produces signals $S_1$, $S_2$, $S_3$ and $S_4$, respectively.

Signals $S_1$, $S_2$, $S_3$ and $S_4$ can be combined to produce various error signals. For example, a differential phase detection (DPD) error signal can be defined as: $[(S_2+S_4)-(S_1+S_3)]$. For comparison purposes, the DPD signal can be normalized by the total intensity $(S_1+S_2+S_3+S_4)$ to produce a normalized DPD signal $S_{DPD}$:

$$S_{DPD} = \frac{(S_2+S_4)-(S_1+S_3)}{S_1+S_2+S_3+S_4}.$$

It was found that the normalized DPD signal is only about $10^{-5}$. The signal reverses sign between positions 3 and 4.

A push-pull error signal can be defined as:

$$S_{PP} = \frac{(S_1+S_4)-(S_2+S_3)}{S_1+S_2+S_3+S_4}.$$

Figure 9:
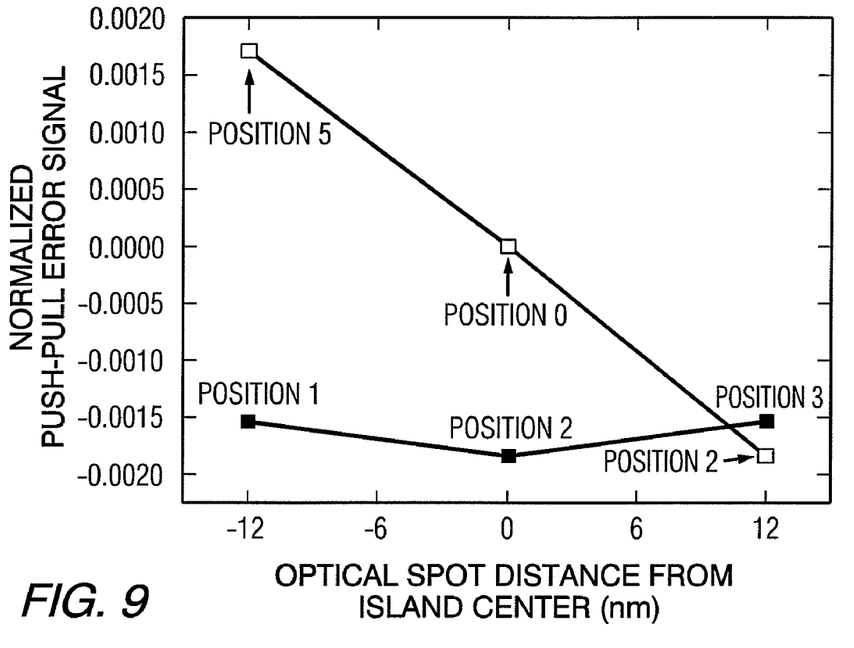
FIG. 9 is a graph of a push-pull error signal with respect to the position of an optical spot on an island of the media.

FIG. 9 is a graph of a push-pull error signal with respect to the position of an optical spot on an island of the media. FIG. 9 shows the push-pull error signal when the optical spot scans from position 5 to 2 and from position 1 to 3. It is seen that the push-pull error signal is $\sim 1.5 \times 10^{-3}$. FIG. 9 shows the push-pull error signal as the optical spot scans across the middle of a bit, from position 5 to position 2, or scans along the edge of a bit, from position 1 to position 3.

This signal may be used for a servo, because it is a differential signal and the noise level is also low. However, this signal is zero when the optical spot is in the middle between two rows of bits.

An edge detection signal is defined as:

$$S_{ED} = \frac{(S_1+S_2)-(S_3+S_4)}{S_1+S_2+S_3+S_4}.$$

Figure 10:
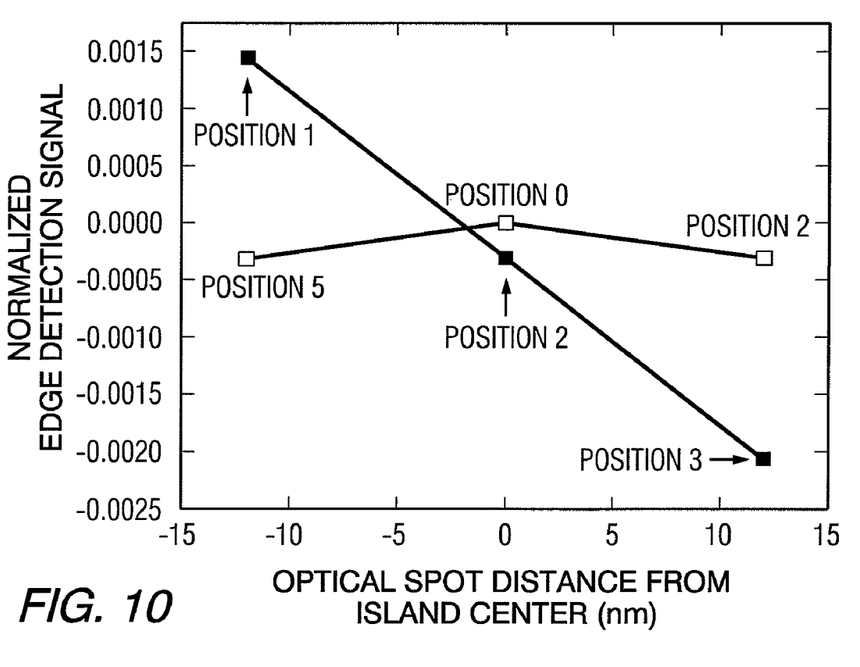
FIG. 10 is a graph of an edge detection error signal with respect to the position of an optical spot on an island of the media.

FIG. 10 is a graph of an edge detection error signal with respect to the position of an optical spot on an island of the media. FIG. 10 shows the push-pull error signal when the optical spot scans from position 5 to 2 and from position 1 to 3. FIG. 10 shows the edge detection signal as the optical spot scans across the middle of a bit, from position 5 to position 2, or scans along the edge of a bit, from position 1 to position 3. It is evident that the edge detection signal has the same magnitude as the push-pull signal but it behaves differently from the push-pull signal. It may be used to pinpoint the spot position on the bit.

The reflection also changes as the optical spot moves. The amount of change is about 0.8% since it is a sum signal, and the noise level is high.

In another implementation, the optical sensor need not have the resolution of an individual bit on the media. For example, the sensor could sense light reflected from a plurality of n bit islands, and the write clock can be multiplied to account for sensing of multiple bit islands. If the phase of the signal resulting from light reflected from n bit islands is accurate enough, then there is no need to resolve each bit island with the optical sensor. As an example, if one of every 10 bits is missing, or if every 10 bit islands is shifted by half a bit, then a sensor that detects light reflected from at least 10 bit islands can be used.

While the invention has been described in terms of several examples, it will be apparent that various changes can be made to the described examples without departing from the scope of the invention as set forth in the following claims. The implementation described above and other implementations are within the scope of the following claims.

What is claimed is:

1. An apparatus comprising:
   a bit patterned magnetic storage media;
   a write transducer positioned adjacent to the bit patterned magnetic storage media;
   a write driver coupled to the write transducer to deliver write pulses to the write transducer;
   an optical sensor for producing a bit pattern signal; and
   a timing recovery circuit for producing a synchronization signal in response to the bit pattern signal, wherein the timing of the write pulses is adjusted in response to the synchronization signal.

2. The apparatus of claim 1, wherein the optical sensor comprises:
   a near field transducer including a metallic pin and a lens for directing light onto the metallic pin.

3. The apparatus of claim 2, wherein an end of the pin has a cross-sectional area less than a cross-sectional area of a surface of islands in the bit patterned media.

4. The apparatus of claim 1, further comprising:
   a light source for directing light onto a surface of the bit patterned media; and
   a quadrant optical detector for detecting light reflected from a surface of the bit patterned media.

5. The apparatus of claim 1, wherein the optical sensor senses light reflected from one bit island on the bit patterned magnetic storage media.

6. The apparatus of claim 1, wherein the optical sensor senses light reflected from a plurality of bit islands on the bit patterned magnetic storage media.

7. A method comprising:
   using an optical sensor to produce a bit pattern signal representative of locations of bit islands in a bit patterned magnetic storage media; and
   using the bit pattern signal to control the timing of write pulses applied to a write transducer to control a direction of magnetization of the bit islands.

8. The method of claim 7, wherein the optical sensor comprises:
   a near field transducer including a metallic pin and a lens for directing light onto the metallic pin.

9. The method of claim 8, wherein an end of the pin has a cross-sectional area less than a cross-sectional area of a surface of islands in the bit patterned media.

10. The method of claim 7, wherein the step of using a near field optical transducer to produce a bit pattern signal representative of locations of bit islands in a bit patterned magnetic storage media comprises:

directing light onto a surface of the bit patterned media; and using a quadrant optical detector for detecting light reflected from a surface of the bit patterned media.

11. The method of claim 7, wherein the optical sensor senses light reflected from one bit island on the bit patterned magnetic storage media.

12. The method of claim 7, wherein the optical sensor senses light reflected from a plurality of bit islands on the bit patterned magnetic storage media.

13. A method comprising:

directing a spot of light onto a surface of a bit patterned data storage media; and producing an error signal in response to light reflected from an island on the bit patterned data storage media, wherein the error signal is representative of a position of the spot with respect to the island.

14. The method of claim 13, wherein the light detector produces first, second, third and fourth detector signals and the error signal is a difference between a sum of the first and fourth detector signals and sum of the second and third detector signals.

15. The method of claim 13, wherein the error signal comprises:

an edge detection signal.

16. The method of claim 13, wherein the error signal comprises:

a push-pull signal.

17. The method of claim 13, wherein the error signal comprises:

a differential phase detection signal.

18. The method of claim 13, wherein the light detector produces first, second, third and fourth detector signals and the error signal comprises a sum of the first, second, third and fourth detector signals.

19. The method of claim 13, wherein the spot has a diameter that is less than a width of islands on the bit patterned data storage media.

* * * * *